(12) United States Patent
Führer et al.

(10) Patent No.: US 6,668,670 B1
(45) Date of Patent: Dec. 30, 2003

(54) STEP-CHANGE GEARBOX

(75) Inventors: Gerhard Führer, Friedrichshafen (DE); Hermann Lanz, Frickingen (DE); Roland Stauber, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 15 days.

(21) Appl. No.: 10/111,514
(22) PCT Filed: Nov. 9, 2000
(86) PCT No.: PCT/EP00/11059
   § 371 (c)(1),
   (2), (4) Date: Apr. 24, 2002
(87) PCT Pub. No.: WO01/35000
   PCT Pub. Date: May 17, 2001

(30) Foreign Application Priority Data
Nov. 11, 1999 (DE) .................... 199 54 130

(51) Int. Cl.⁷ .................................. F16H 3/089
(52) U.S. Cl. ............................... 74/325; 74/331
(58) Field of Search ................ 74/325, 331, 359, 74/360, 375

(56) References Cited

U.S. PATENT DOCUMENTS

| | | | |
|---|---|---|---|
| 4,000,662 A | * 1/1977 | Wolfe | 74/331 |
| 4,104,928 A | * 8/1978 | Vandervoort | 74/331 |
| 4,388,838 A | 6/1983 | Richards et al. | 74/331 |
| 4,765,197 A | 8/1988 | Yarnell | 74/467 |
| 5,184,522 A | * 2/1993 | Nordkvist | 74/359 |
| 5,284,067 A | 2/1994 | Seaman | 74/606 R |
| 5,711,186 A | * 1/1998 | Lee | 74/331 |

FOREIGN PATENT DOCUMENTS

| | | | |
|---|---|---|---|
| DE | 1 824 585 | 9/1958 | |
| DE | 44 29 546 A1 | 2/1996 | ............ F16H/3/16 |
| DE | 199 04 479 A1 | 8/2000 | ............ F16H/3/091 |
| GB | 2 081 825 A | 2/1982 | ............ F16H/3/08 |

\* cited by examiner

Primary Examiner—Ankur Parekh
(74) Attorney, Agent, or Firm—David & Bujold, PLLC

(57) ABSTRACT

Multi-speed step-change transmission for commercial vehicles having an one input shaft, a main shaft placed in an axial extension, one countershaft parallel thereto and one intermediate shaft parallel to the two shafts for the reverse gear and the shafts have gear wheels forming the ratio steps of the transmission. The sum of the tip radii of the intermediate gear (3) for the reverse gear and of the main shaft gear (1) for the first gear is smaller than the axial separation (a) between the main shaft (5) and the intermediate shaft (6).

2 Claims, 1 Drawing Sheet

STEP-CHANGE GEARBOX

FIELD OF THE INVENTION

The invention relates to a multi-speed step-change transmission, especially for commercial vehicles, having one input shaft and one main shaft situated in an axial extension of the input shaft, one countershaft disposed parallel to the main shaft and, situated parallel to said two shafts, one intermediate shaft of the reverse gear.

BACKGROUND OF THE INVENTION

Such step-change transmission are widely known. The Applicant's DE A 44 29 546 thus describes a multi-speed step-change transmission wherein the main shaft and the countershaft are provided with gear wheels engaged with each other and forming the ratio steps of the transmission. The countershaft itself is divided, both parts of the countershaft being optionally connectable with the main shaft; in the normal forward gears one part of the countershaft remains uncoupled. Such transmissions can particularly be used in commercial vehicles having nine or ten gears.

In multi-speed step-change transmissions for commercial vehicles, the teeth of the countershaft for the reverse gear are often identical with those of the first gear, there necessarily resulting a somewhat quicker reverse gear with a velocity increase amounting to about 5% to 10%. Therefore, these equal countershaft teeth are selected in order to produce the two countershaft teeth in one operation and with the same tool or the same tools. But the quicker ratio in reverse gear results in an overall gear ratio of the transmission caused thereby. The required overall gear ratio of the transmission results from the marginal conditions of a creep velocity as low as possible in the first gear and in the reverse gear at idling rotational speed of about 600 r.p.m. and a motor rotational speed as favorable to consumption as possible of about 1200 r.p.m. to 1500 r.p.m. at a maximum speed which is of about 85 km/h. However, as result of the given vagueness in reverse drive, there is as a rule desired a lower creep velocity in the reverse gear than in the first gear, for example, <2.5 km/h in reverse gear compared to <3.0 km/h in the first gear.

Transmissions have become known that make possible in the reverse gear a slower ratio than in the first gear. But those transmissions have the disadvantage that different tools are required for producing the different teeth, which increases the production costs.

In the Applicant's German Patent Application No. P 199 04 479, a transmission has already been proposed which makes a slower creep velocity in the reverse gear possible than in the first gear simultaneously with a reduced overall gear ratio of the transmission and in which the same tools can be used in the production of the teeth so that costs can be lowered in the production. In said transmission the gear wheel provided upon the main shaft for the first gear has the same teeth as the gear wheel provided upon the main shaft for the reverse gear.

However, in this and the other known transmissions mentioned above it is not possible that the intermediate gear for the reverse gear lie in axial direction in the area of the gear for the first gear, since the sum of tip radii of the intermediate gear for the reverse gear and of the main shaft gear for the first gear is greater than the axial separation of the main shaft from the intermediate shaft for the reverse gear.

The problem on which this invention is based is to provide a step-change transmission which, in axial direction, needs less installation space than the step-change transmissions known already and which has a higher transmission ratio in reverse gear than in the first gear simultaneously with reduced overall gear ratio of the transmission and where the same tools for the production of the teeth make lower production costs possible.

On the basis of a step-change transmission of the kind specifically mentioned above, said problem is solved with the feature stated in the characteristic part of the main claim; an advantageous embodiment is described in the sub claim.

SUMMARY OF THE INVENTION

According to the invention, it is, therefore, provided that the teeth of the gear train from first gear and reverse gear be configured so that the intermediate gear for the reverse gear can use, in axial direction, the same space as the main shaft gear for the first gear. Furthermore, the tooth geometry is identical on the countershaft for the first gear and the reverse gear.

The configuration is especially advantageous for transmissions where the main shaft gear for the first gear and the main shaft gear for the reverse gear are disposed directly side by side, that is, no shifting set or the like is situated between the two gears.

More precisely said, the sum of the tip radii of the intermediate gear for the reverse gear and of the main shaft gear for the first gear is smaller than the axial separation between the main shaft and the intermediate shaft for the reverse gear. It is thereby possible that the engagement between countershaft for the reverse gear and intermediate gear for the reverse gear occurs in an axial plane different from that of the engagement between the intermediate gear for the reverse gear and the main shaft gear for the reverse gear.

The inventive configuration offers the further advantage that no altering stress due to root foot bending of the intermediate gear for the reverse gear occurs so that less space is needed in axial direction. The required tooth width between countershaft for reverse gear and intermediate shaft for reverse gear is not included in the total length of the transmission as long as the following condition is met: width of the first gear≧width of the reverse gear VW/ZW.

In reverse gear, a higher transmission ratio than in the first gear is possible with simultaneously reduced overall gear ratio of the transmission; for the first gear and, for the reverse gear, equal teeth are possible upon the countershaft, it being possible to design shorter the teeth upon the countershaft, that is, only as wide as it is needed for the first gear.

The production costs are kept low because of the equal tools for producing the teeth (equal module and equal helix angle of the teeth of the first gear and of the reverse gear). The inventive configuration thus combines the advantages of the known technical solutions without their disadvantages.

BRIEF DESCRIPTION OF THE DRAWING

The invention will now be described, by way of example, with reference to the accompanying drawings in which.

DETAILED DESCRIPTION OF THE INVENTION

Figure 2:
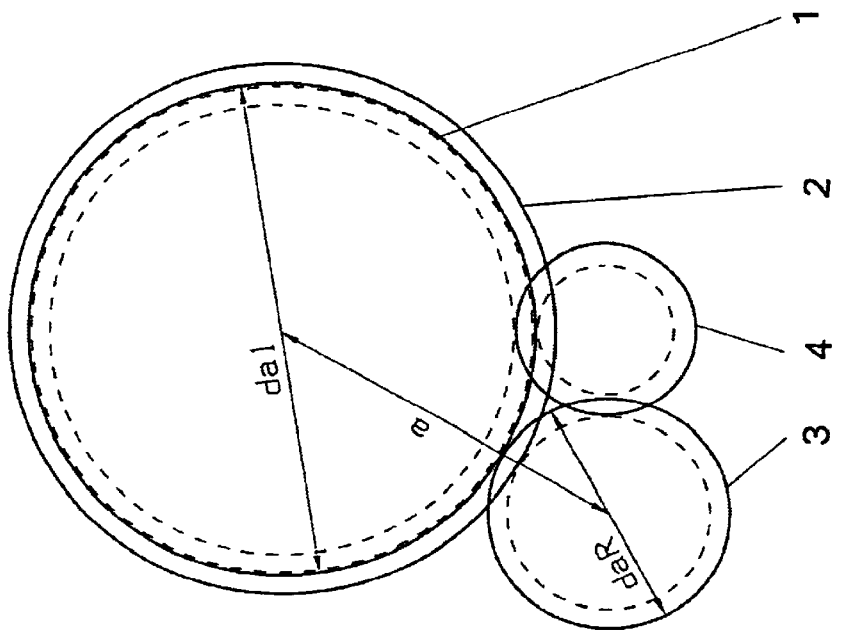
FIG. 2 shows a side view of the gear wheels situated in this place.
Figure 1:
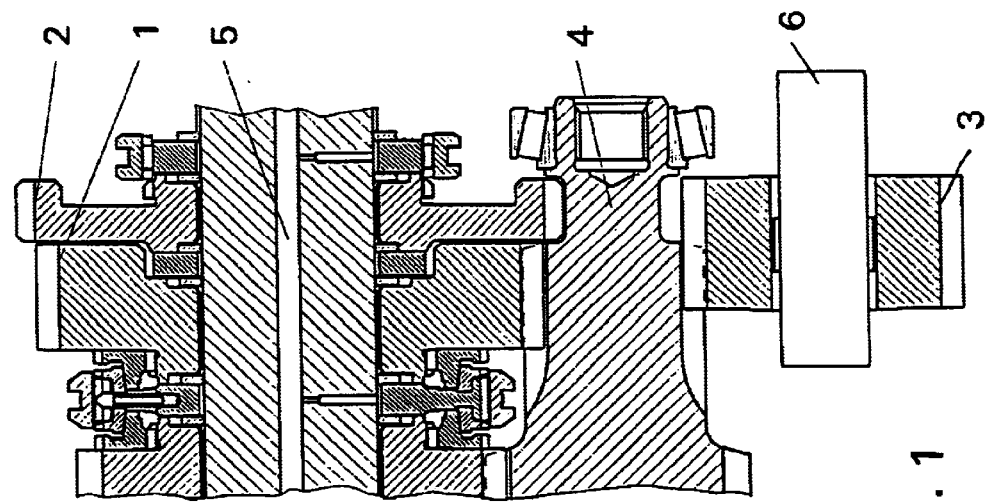
FIG. 1 shows a longitudinal section through one of part of the inventive step-change transmission.

It is provided according to the invention that the sum of the tip diameters of the intermediate gear 3 for the reverse gear $$\frac{daR}{2}$$

and of the main shaft gear 1 for the first gear $$\frac{da1}{2}$$

be smaller than the axial separation a between main shaft 5 and intermediate shaft 6. It is thereby possible that the engagement between reverse gear countershaft 4 and the intermediate gear 3 for the reverse gear occurs in an axial plane different from the engagement between the intermediate gear 3 for the reverse gear and the main shaft gear 2 for the reverse gear.

It is provided according to the invention that the sum of the tip radii of the intermediate gear 3 for the reverse gear $$\frac{daR}{2}$$

and of the main shaft gear 1 for the first gear $$\frac{da1}{2}$$

be smaller than the axial separation a between main shaft 5 and intermediate shaft 6. It is thereby possible that the engagement between reverse gear countershaft 4 and the intermediate gear 3 for the reverse gear occurs in an axial plane different from the engagement between the intermediate gear 3 for the reverse gear and the main shaft gear 2 for the reverse gear.

REFERENCE NUMERALS

1 main shaft gear of first gear
2 main shaft gear of reverse gear
3 intermediate gear for reverse gear
4 countershaft
5 main shaft
6 intermediate shaft

What is claimed is:

1. A multi-speed step-change transmission having one input shaft and one main shaft (5) situated in an axial extension of the input shaft, one countershaft (4) disposed parallel to the main shaft (5); the main shaft (5) and the countershaft (4) having gear wheels forming ratio steps of the transmission including a main shaft gear (1) for first gear and a main shaft gear (2) for reverse gear on the main shaft, one intermediate gear (3) for the reverse gear upon an intermediate shaft (6) and teeth for the reverse gear and the first gear upon the countershaft (4);

wherein a sum of a tip radius (daR/2) of the intermediate gear (3) for the reverse gear and a tip radius (da1/2) of the main shaft gear (1) for the first gear is smaller than an axial separation (a) between the main shaft (5) and the intermediate shaft (6).

2. The step-change transmission according to claim 1, wherein a geometry of the teeth upon the countershaft (4) is identical for the first gear and for the reverse gear.

\* \* \* \* \*